INVENTOR.
WILHELM BAASNER

June 18, 1963

W. BAASNER 3,094,035

PROJECTION PRINTER PROVIDED WITH
COMPARISON NEGATIVES

Filed May 6, 1959

INVENTOR.
WILHELM BAASNER

BY

Michael S. Striker
R Ho

June 18, 1963

W. BAASNER 3,094,035

PROJECTION PRINTER PROVIDED WITH
COMPARISON NEGATIVES

Filed May 6, 1959

INVENTOR.
Wilhelm Baasner
BY
Michael S. Striker
Atty.

United States Patent Office 3,094,035
Patented June 18, 1963

3,094,035
PROJECTION PRINTER PROVIDED WITH COMPARISON NEGATIVES
Wilhelm Baasner, Munich, Germany, assignor to Agfa Aktiengesellschaft, Leverkusen-Bayerwerk, Germany
Filed May 6, 1959, Ser. No. 811,406
Claims priority, application Germany May 7, 1958
10 Claims. (Cl. 88—24)

The present invention relates to photographic devices and more particularly to devices for printing positives from negatives.

The present invention relates to that class of printing devices known as projection printers wherein the negative is placed on an enlarger and an image thereof projected to provide the final print.

At the present time, projection printers of the above type have serious drawbacks particularly with respect to the selection of a contrast grade which will provide the best possible print. This drawback is particularly bothersome in those cases where relatively inexperienced labor is relied on for making the prints, as is the case during busy seasons. Moreover, amateurs who provide their own prints often are incapable of obtaining really good prints because they are incapable of evaluating the quality of the negative which is to be printed.

Although attempts have been made in the past to solve this problem, a fully satisfactory solution has not yet been provided. For example, with some projection printers, the operator is required to perform special manual operations after each exposure so that the labor costs are undesirably high and the output is undesirably low.

One of the objects of the present invention is to provide a projection printing arrangement which will enable unskilled labor and amateurs to produce prints of the highest quality.

Another object of the present invention is to provide a projection printer which can be operated so as to produce a series of prints very rapidly without requiring any time consuming operations before each exposure.

It is also an object of the present invention to provide a structure capable of accomplishing the above objects and at the same time composed of simple, ruggedly constructed elements which are very reliable in operation.

With the above objects in view, the present invention includes in a projection printer an image receiving means for receiving an image of the negative which is to be printed. In accordance with the invention, a row of comparison negatives is located adjacent to the image receiving means and positioned in a manner enabling the operator to observe the image receiving means and the row of comparison negatives simultaneously so that the operator can very easily and quickly make a selection of the proper comparison negative. Of course, once the proper comparison negative is selected, the printing can be carried out in accordance with the selection either by controlling the light which is received by the printing paper or by selecting a special printing paper corresponding to the selected comparison negative.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
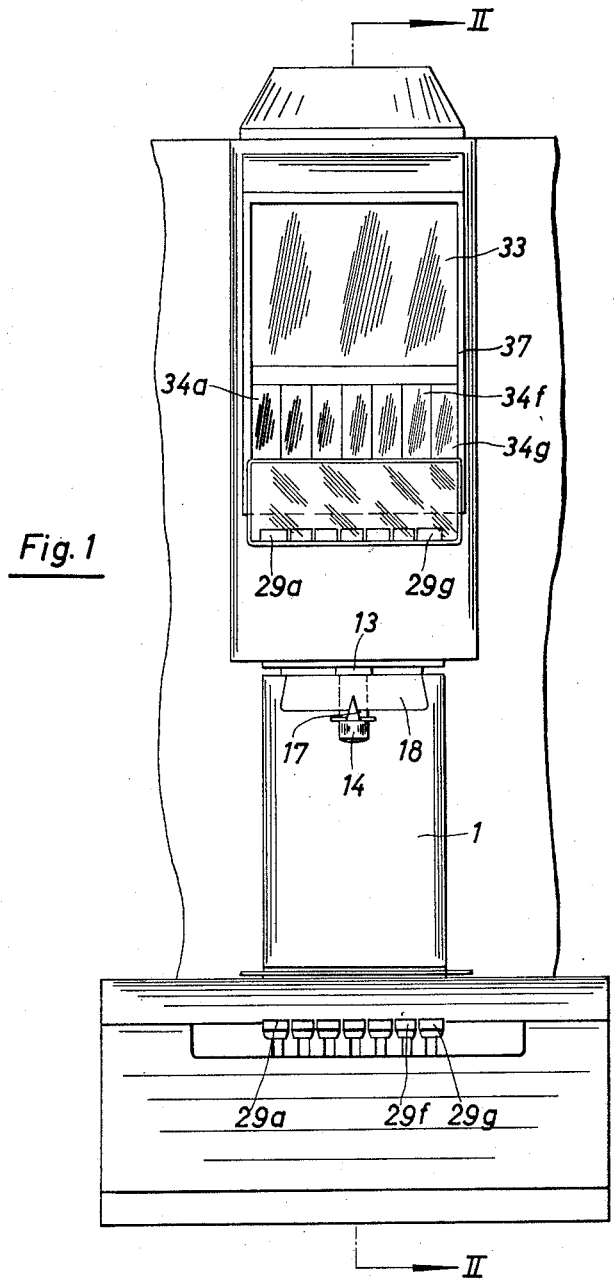
FIG. 1 is a fragmentary front elevational view of an enlarger provided with the structure of the invention.
Figure 2:
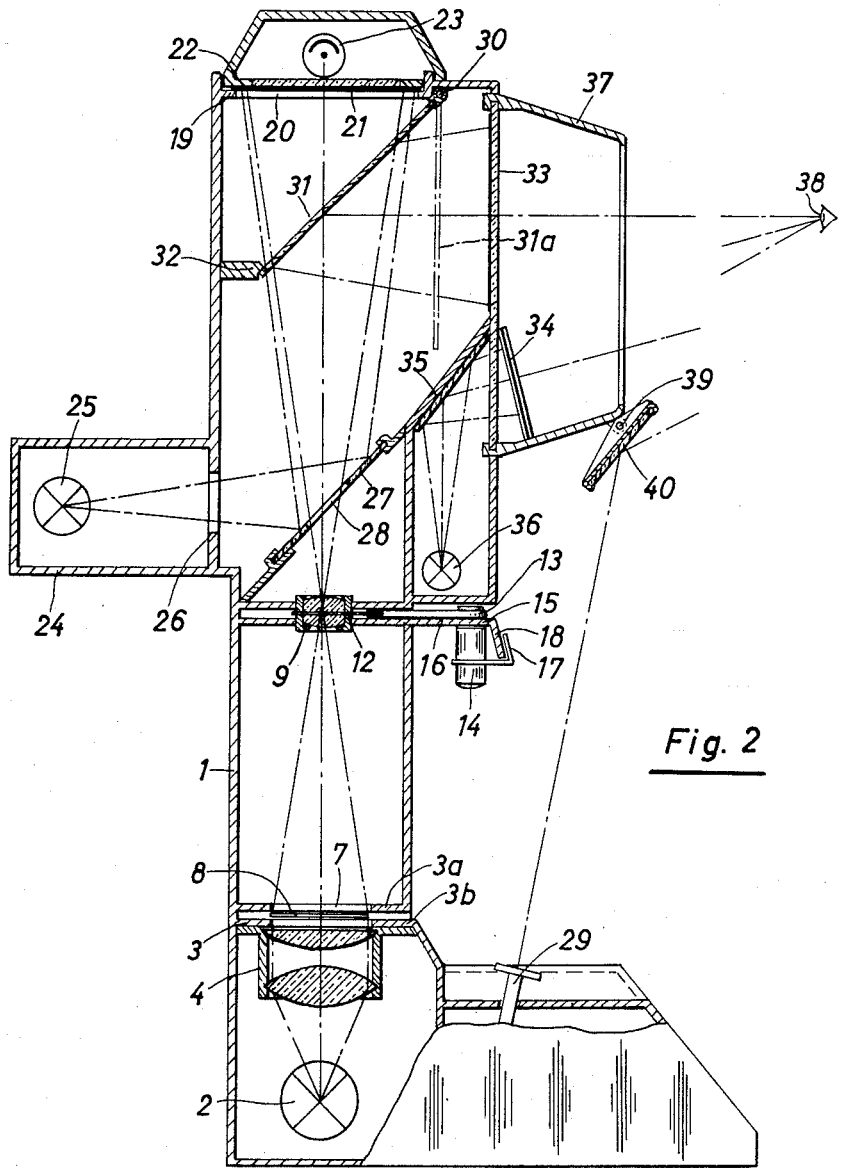
FIG. 2 is a sectional view of the structure of FIG. 1 taken along the line 2—2 in the direction of the arrow.

Referring now to FIGS. 1 and 2, the projection printer illustrated therein includes a housing 1 carrying at an interior lower portion a light source 2 which provides the copying light. Above the light source 2 is arranged a guide 3 for the negatives to be printed, and a condenser 4 is arranged between the light source 2 and the aligned windows 7 of the parallel plates 3a and 3b which cooperate to form the negative support and guide 3. The film 8 is located between the plates 3a and 3b and a known drive feeds the film 8 in stepwise fashion past the aligned windows 7 so as to successively locate the row of negatives on the film 8 in alignment with the windows 7.

The objective 9 of the enlarger is provided between its lenses with a diaphragm 12 capable of being adjusted so as to provide a selected aperture size through which the light passes. The diaphragm 12 is adjusted by manipulation of the handle 14 which has an upper portion extending through a slot 15 of the plate 16 and connected to the adjusting lever 13 which in turn is connected to the diaphragm 12 to adjust the latter according to the position of the lever 13. The handle 14 additionally carries a pointer 17 which rides along a scale 18.

At the upper part of the housing 1 is the support 19 for the printing paper, this support 19 forming the window 20 through which the printing paper is exposed. A band of printing paper is moved in stepwise fashion along the support 19 in timed relation with the movement of the film 8 so that the printing paper 21 will provide prints of the negatives. During exposure of the printing paper, it is urged downwardly against the support 19 by the pressure plate 22 which may be pivotally connected, for example, to the housing 1, and which itself forms part of a housing for a photocell 23 capable of automatically actuating a device which controls the exposure time, the pressure plate 22 being at least partly transparent so that light passing through the printing paper 21 will reach the photocell 23. Of course, the entire housing of the photocell, including the pressure plate 22, is turnable with respect to the housing 1.

The housing 1 has a rear extension 24 forming a compartment in which an additional light source 25 in the form of a suitable lamp is housed. The light from the lamp 25 passes through an aperture 26 to a reflector 27 arranged in a plane which makes an angle of 45° with respect to the optical axis. Thus, the light from the lamp 25 will be reflected by the reflector 27 up to the window 20 where the printing paper is exposed. The reflector 27 is formed with a cutout 28 through which light from the lamp 2 passes to the printing paper. The printing paper has a relatively high contrast grade, and softer contrast grades are obtained by regulation of the intensity of the lamp 25 and, if desired, also by regulating either the size of the opening 26 or the extent of time during which the opening 26 is maintained open. Where the different grades of contrast are obtained with the same printing paper by variations in the intensity of the lamp 25, a variable resistor capable of being adjusted by the operator is connected into the circuit of the lamp 25. At a lower part of the housing 1, in a position easily accessible to the operator, is a row of keys 29a—29g capable of being selectively depressed by the operator for adjusting such a variable resistor so as to provide a selected light intensity with the lamp 25.

The support 19 for the printing paper pivotally carries by means of a hinge 30, for example, a reflector 31 which is opaque and which reflects at its lower surface, as viewed from FIG. 2. When the reflector 31 is in the solid line position thereof shown in FIG. 2, the reflector 31 is in a plane which makes an angle of 45° with the optical axis and intercepts the light which would otherwise reach the printed paper so as to prevent exposure of the latter when the reflector 31 is in the solid line position of FIG. 2. In this position, the reflector 31 engages a stationary portion 32 of the housing 1 which extends along the periphery of the reflector 31 to form a light-proof interception in the travel of the light to the printing paper. In this solid line position of the reflector 31, the light which would otherwise reach the printing paper is reflected by the reflector 31 to an image receiving means formed by a matt sheet 33 of glass, or the like. For example, the sheet 33 may be frosted glass. The image receiving means 33 is located within an observation compartment 37 which is open at its right end, as viewed in FIG. 2 so that the operator may view the interior of the compartment 37 to observe the image at the sheet 33. It will be noted from FIG. 2 that this image will be located at an upper portion of the observation compartment 37.

A row of comparison negatives 34 is arranged along a lower portion of the compartment 37 extending transversely across the latter in the interior thereof overlapping a lower portion of the image receiving means 33 as indicated in FIG. 2, so that the row 34 of comparison negatives 34a—34g is visible in the compartment 37. The length of the row of comparison negatives 34 is equal to the width of the sheet 33 and, therefore, equal to the width of the negative image on the sheet 33, and the several comparison negatives are of equal size and are distributed across the sheet 33 in the manner shown in FIG. 1 with the grades of contrast progressing from one end to the other of the row, as indicated in FIG. 1. Thus, the observer can simultaneously observe the image of the negative 8 and the comparison negatives 34a—34g to quickly and accurately determine which of the comparison negatives corresponds to the quality of the negative 8 which is being printed. The selection of the proper comparison negative controls the selection of the intensity of the lamp 25.

A separate lamp 36 is provided for illuminating the row of comparison negatives 34, and the location of the lamp 36 is such that light issuing therefrom cannot directly reach the row of negatives 34. The light from the lamp 36 is reflected to the row of negatives 34 by the reflector 35.

As is apparent from FIG. 2, the row of negatives 34 is located in a plane inclined to the plane of the sheet 33 at such an angle that the central line of the negative image above the row 34 and normal to the sheet 33 will intersect the central line of the row of negatives 34 which is perpendicular to the plane of this row at the eye 38 of the operator so that the operator can readily observe simultaneously the image of the negative to be printed and the several comparison negatives.

Fixed to the underside of the lower wall of the observation compartment 37 is a pivot pin 39 which pivotally supports a reflector 40 for turning movement around a horizontal axis with sufficient friction to maintain the reflector 40 in its angle of adjustment, and this reflector 40 has the same width as the sheet 33 and the row of comparison negatives 34. The angle at which the reflector 40 is set is so chosen that the image of the keys 29 will be reflected by the reflector 40 to the eye 38 so that an image of the several keys 29a—29g is visible to the operator directly beneath the row of comparison negatives 34. These keys 29 can be made of a luminous material so as to be self-illuminating or a special light source may be provided to render the keys easily visible to the operator. Inasmuch as FIG. 1 is a front elevation of the structure of FIG. 2, the image of the keys 29 appears along the lower edge of the reflector 40. In actual practice, the eye 38 of the observer sees the sheet 33, the comparison negatives 34 and the keys 29 directly next to each other.

During use of this structure of FIGS. 1 and 2, the light intensities of the image of the negative 8 and of the comparison negatives 34 are equalized by adjustment of the diaphragm 12, and it will be noted that this is brought about by maintaining a constant light intensity at the comparison negatives 34 and regulating the light intensity of the negative image. Then a comparison negative is selected which has a contrast corresponding to that of the negative image, and the key 29 which is aligned beneath the selected comparison negative is depressed so as to regulate the intensity of the lamp 25 in the above-described manner. For example, if the negative 34f corresponds most closely to the quality of the image on the sheet 33, the key 29f is depressed so as to provide a selected intensity of the lamp 25. Then the reflector 31 is turned to the vertical position 31a shown in dot-dash lines in FIG. 2 so as to expose the printing paper. The ending of the exposure brought about by return of the reflector 31 to the solid line position indicated in FIG. 2 takes place automatically.

It will be noted that with the above-described structure, the manual adjustment of the diaphragm 12 to provide an intensity of the illumination of the negative image which corresponds to the intensity of illumination of the comparison negatives automatically regulates the amount of light passing to the printing paper from the lamp 2 so that a light intensity proportional to the quality of the negative 8 is obtained in this way. With the structure of the invention described above, the same printing paper is used for all the negatives and the exposure time for each exposure may be constant, the compensation for the differences between the several negatives being taken care of by the setting of the diaphragm 12 and the selection of the intensity of the lamp 25 so that high quality prints are obtained in this way. In some special cases, a particular negative may have a relatively dark portion which is of greater significance than a lighter portion of the negative, and in such cases, the regulation of light intensity by adjustment of the diaphragm 12 can be made according to this relatively dark but more significant portion of the image, and the selection of a negative 34 of appropriate contrast may also be carried out according to the particularly important part of the negative.

The endless side wall of the compartment 37 prevents stray light from disturbing the accurate evaluation of the negative image and comparison negative.

Figure 5:
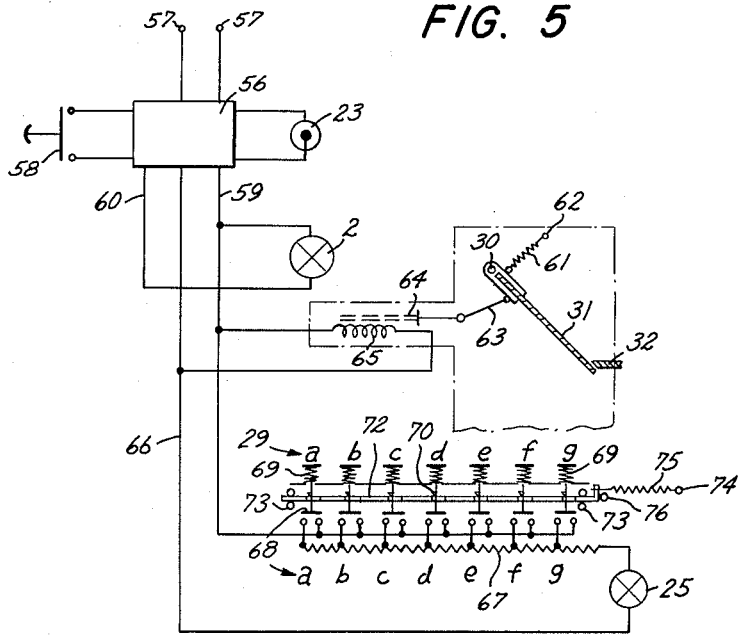
FIG. 5 is a wiring diagram showing the electrical structure of the enlarger of FIGS. 1 and 2.

Referring now to FIG. 5, it will be seen that the photocell 23 is electrically connected with an electrical control unit 56 which is connected at 57 to the lines. A hand switch 58 is available for starting the enlarger and for starting the operation of the control unit 56. The current which is supplied from the photocell 23 is amplified by the unit 56 and serves to turn off the lamps 2 and 25 when the printing paper has received a predetermined amount of light. The unit 56 is adjustable in a known way so as to control the amount of light required to be received by the photocell 23 for turning off the lamps 2 and 25. The projecting lamp 2 is electrically connected with the unit 56 through the leads 59 and 60. The arrangement is such that when an exposure operation has been completed, the lamp 2 is still energized with a low voltage so that the negative can still be observed by reflection from the reflector 31.

This reflector 31 is, for example, fixed with the shaft 30 which is turnably carried by the housing, and a spring 61 which is fixed to a stationary part of the enlarger at 62 (FIG. 5) serves to hold the combined reflector and screen 31 against the member 32 so as to close off the printing paper from the light source. A connecting rod 63 serves to interconnect the tiltable reflector 31 with an armature 64 of an electromagnet 65 which is electrically connected to the leads 59 and 66. The electromagnet becomes energized when the unit 56 is set into operation by manual closing of the switch 58, and when the electromagnet 65 is energized, the armature 64 pulls the reflector 31 through the connecting rod 63 in opposition to the spring 62 to the dot-dash line position indicated at 31a in FIG. 2. When the printing paper 21 has been exposed to a predetermined extent, determined by setting of the unit 56, this extent of exposure being indicated by the amount of electricity supplied to the unit 56 by the photocell 23, then the electromagnet 65 is automatically de-energized, for example, by opening of a switch of the line 66 which is located within the unit 56, and thus the reflector 31 is released to the spring 61 which returns the reflector 31 to the position indicated in FIGS. 2 and 5.

As is apparent from FIG. 5, a resistor 67 is connected in the circuit between the lamp 25 and the lead 59, and different lengths of the resistor 67 will be connected into the circuit depending upon which of the keys 29a—29g depressed by the operator. In this way it is possible to control the voltage delivered to the lamp 25 and thus to control its brightness.

As is apparent from FIG. 2, the keys 29a—29g are movably supported by the housing of the enlarger, and as may be seen from FIG. 5, these keys are urged upwardly into their rest position by the springs 69, respectively. Also, each key carries a substantially wedge-shaped projection 70, and these projections 70 are respectively located just over a series of openings 71 in an elongated slide bar 72 which is supported by rollers 73 for movement to the right and left, as viewed in FIG. 5, a spring 75 being connected at one end to the bar 72 and at its opposite end to a stationary pin 74 for urging the right end of the bar 72 against a stop 76, as indicated in FIG. 5. When the operator depresses one of the keys 29a—29g, the projection 70 of the key will engage the end of the aligned opening 71 of the bar 72 and urge the latter to the left against the force of the spring 75 until the projection 70 of the depressed key becomes located beneath the bar 72, after which the spring 75 returns the bar 72 against the stop 76 with the bar 72 now snapping over the projection of the depressed key so as to retain the latter in its depressed position closing the aligned switch 68a—68g shown in FIG. 5. Thus, if, for example, the key 29f is depressed, the switch 68f will be closed and a predetermined portion of the resistor 67 will be located in the circuit. This key will remain depressed until another key is depressed by the operator. Thus, when the second key is depressed the bar 72 will again be moved to the left so as to release the previously depressed key for return movement to its open position by the spring 69 while the newly depressed key will again be releasably locked in the depressed position in the manner described above. Thus, assuming that the key 29c is depressed by the operator after the key 29f has already been depressed as pointed out above, then when the downward movement of the key 29c urges the bar 72 to the left, as viewed in FIG. 5, the key 29f will return to its rest position as the result of the action of the spring 69 and the bar 72 will now snap over the projection of the key 29c to maintain the latter in its depressed position closing the switch 68c, only this latter switch being closed at this time. Pointed free ends of the substantially wedge-shaped projections 70 may be rounded off so as to facilitate the return movement of the keys to their rest position.

Figure 6:
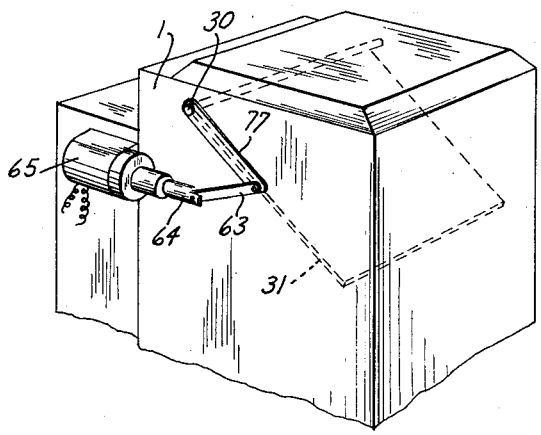
FIG. 6 is a fragmentary perspective illustration of a control for a tiltable element of the enlarger.

As may be seen from FIG. 6, the rod 30 which fixedly carries the tiltable reflector 31 extends to the exterior of the housing of the enlarger where a free end of the rod 30 is fixed to a bar 77 which is in turn pivotally connected to one end of the connecting rod 63, the other end of the connecting rod 63 being pivotally connected to the armature 64 of the solenoid 65 described above.

Figure 3:
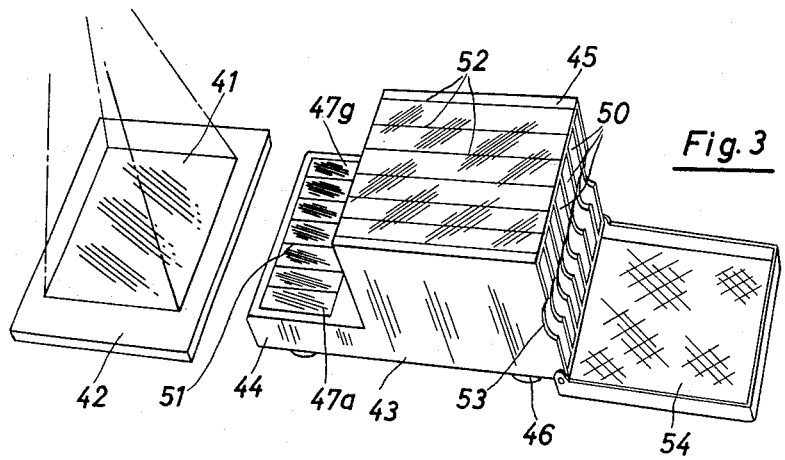
FIG. 3 is a perspective illustration of part of an enlarger and a unit according to the present invention which is used in the enlarger.
Figure 4:
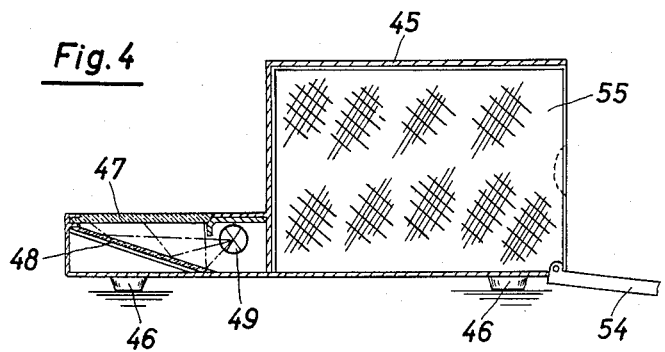
FIG. 4 is a longitudinal sectional elevational view of the unit of FIG. 3.

The construction of FIGS. 3 and 4 is adapted to be used with very simple enlargers where there are no light intensity adjustments, or the like, of a light source in addition to that which projects the image of the negative. FIG. 3 shows the frame 42 of the support 41 of this simple small enlarger, the printing paper being placed on the support 41 to be exposed at this location for making a print. Before the printing paper is placed on the support 41, this support 41, which may be made of frosted glass, or the like, receives an image of the negative, or, if desired, the negative itself can be placed on the support 41. With such a simple projection printer, the variations in the negatives are compensated by making a selection of a particular printing paper from a wide variety of printing papers of different grades of contrast. For this purpose, the assembly 43 of the present invention is used. This unit 43 includes a front flat hollow box portion 44 and a printing paper container 45 behind the box portion 44, the entire unit being carried by four feet 46. The top wall of the box portion 44 is formed by a row of comparison negatives 47a—47g illuminated from a light source 49 arranged so that light therefrom cannot directly reach the comparison negatives but is instead reflected to the latter by a light diffusing reflector 48 located within the box portion 44 in the manner illustrated in FIG. 4. The light source 49 is of elongated tubular configuration so as to provide uniform illumination of the comparison negatives, and as is apparent from FIG. 4, a suitable screen is located between the lamp 49 and the comparison negatives to prevent light from travelling directly from the lamp 49 to the comparison negatives.

The container 45 is as wide as the row of comparison negatives and is divided into a series of sub-containers by the parallel partitions 50 which are located in vertical planes, respectively, which respectively include the boundaries between the several comparison negatives 47a—47g. The lines 52 on the top of the container 45 are also respectively located in these planes and the sub-containers are open at their rear end where the partitions are formed with notches 53 to facilitate removal of a sheet of printing paper from a selected sub-container.

Thus, when this embodiment of the invention is used, the unit 43 is placed in the position shown in FIG. 3 with the row of comparison negatives located closely adjacent to the negative or negative image on the support 41 so that the operator can simultaneously view both the negative or negative image and the row of comparison negatives to select that one of the negatives 47a—47g whose quality is closest to the quality of the negative or negative image on the support 41. Having made this selection, the operator will remove a sheet of printing paper from that sub-compartment which is aligned with the selected comparison negative, the sub-compartments being equal to the number of comparison negatives and the printing paper in the several sub-containers having grades of contrast which respectively correspond to the comparison negatives aligned with the sub-containers. Therefore, by removing a sheet of printing paper from a sub-container, the chosen printing paper will have the appropriate grade of contrast. The unit 43 may be provided with suitable indicia indicating the particular printing papers to be placed in the several sub-compartments. The selected printing paper is, of course, placed on the support 41 while the negative is placed in position to have its image projected onto the printing paper for exposing the latter. As is apparent from FIG. 4, the cross section of the several sub-containers is only slightly greater than the size of the printing paper 55 so that a portion of the latter will be accessible in each notch 53.

The unit 43 further includes a rear cover 54 for closing the container 45 so that the printing paper can remain in the unit 43 after the container 45 is closed and the room light is turned on.

If desired, different sets of containers 45 corresponding to different formats may be provided and may be releasably attached to a base plate of the unit 43 in properly aligned position behind the row of comparison negatives, any suitable clamp being provided for releasably fixing a selected container 45 to the base plate of unit 43 in such a construction.

Also, if desired, each of the sub-containers of the container 45 may be further sub-divided into separate compartments of each sub-container which respectively hold printing papers of the same grade of contrast, but of different types such as glossy, semi-matt, matt, etc.

It will be understood that each of the elements described above, or two or more together, may also find a useful application in other types of photographic printers differing from the types described above.

While the invention has been illustrated and described as embodied in projection printers, it is not intended to be limited to the details shown, since various modifications and structural changes may be made without departing in any way from the spirit of the present invention, as defined in the claims.

What is claimed as new and desired to be secured by Letters Patent is:

1. In a projection printer, in combination, image-receiving means for receiving a negative image which is adapted to be observed by the operator; and a series of comparison negatives located adjacent said means to be visible to the operator simultaneously with the negative image, said comparison negatives each having areas of maximum and minimum density and the difference between the maximum and minimum densities of any one of said series of comparison negatives being different from the difference between the maximum and minimum densities of any other one of said series of comparison negatives, so that the operator by simultaneously observing the negative image and the series of comparison negatives can select the comparison negative which has a difference between its areas of maximum and minimum density closest to the difference between the areas of maximum and minimum density of the negative image; and adjusting means for adjusting the amount of light used to expose a print, said adjusting means being actuated by the operator according to the selected comparison negative to adjust said amount of light in accordance with the difference between the areas of maximum and minimum density of the negative image.

2. In a projection printer as recited in claim 1, a pair of illuminating means respectively cooperating with said image receiving means and with said series of negatives for illuminating the image receiving means and the series of negatives; and intensity control means cooperating with at least one of said illuminating means for adjusting the intensity thereof so as to provide equal light intensity for the image receiving means and the series of negatives.

3. In a projection printer as recited in claim 1, a pair of illuminating means respectively cooperating with said image receiving means and with said series of negatives for illuminating the image receiving means and the series of negatives; and intensity control means cooperating with the illuminating means which cooperates with said image receiving means for adjusting the light intensity of the latter until it is equal to the light intensity of said series of negatives, the light intensity of the latter remaining constant.

4. In a projection printer as recited in claim 1, a pair of illuminating means respectively cooperating with said image receiving means and with said series of negatives for illuminating the image receiving means and the series of negatives; and adjustable diaphragm means located in the path of light emanating from at least one of said illuminating means for adjusting the light intensity produced by said one illuminating means so as to provide equal light intensities at the image receiving means and at the series of negatives, the light intensity of the other of said illuminating means remaining constant.

5. In a projection printer as recited in claim 1, a light source for providing light with which the series of negatives are illuminated; light-diffusing reflector means receiving light from said light source and reflecting the light to said series of negatives, said series of negatives being located out of the path of light rays issuing from said light source, so that said series of negatives is illuminated only with reflected light; and illuminating means independent of said light source cooperating with said image-receiving means for illuminating the latter.

6. In a projection printer as recited in claim 1, said series of negatives being located in a plane which makes with respect to the plane in which said image receiving means is located an angle which will direct lines normal to said image receiving means and said series of negatives to the eye of the operator.

7. In a projection printer as recited in claim 1, a horizontal row of operating keys respectively corresponding to said comparison negatives and vertically aligned therewith, said keys forming part of said adjusting means and being adapted to be actuated by the operator for controlling the amount of light used during exposure of a print; and means rendering said row of keys and series of comparison negatives simultaneously visible to the operator so that the key of the selected negative is readily operable.

8. In a projection printer as recited in claim 1, a horizontal row of operating keys respectively corresponding to said comparison negatives and vertically aligned therewith, said keys forming part of said adjusting means and being adapted to be actuated by the operator for controlling the amount of light used during exposure of a print; and means rendering said row of keys and series of comparison negatives simultaneously visible to the operator so that the key of the selected negative is readily operable, said row of keys being arranged at a substantial distance beneath said series of negatives and said means rendering said row and series simultaneously visible including a reflector which reflects to the eye of the operator an image of said keys while the operator observes said comparison negatives.

9. In a projection printer as recited in claim 1, a horizontal row of operating keys respectively corresponding to said comparison negatives and vertically aligned therewith, said keys being adapted to be actuated by the operator for controlling the amount of light used during exposure of a print; and means rendering said row of keys and series of comparison negatives simultaneously visible to the operator so that the key of the selected negative is readily operable, said row of keys being arranged at a substantially different elevation than said series of negatives and said means rendering said row of keys and series of comparison negatives simultaneously visible including a reflector which reflects to the eye of the operator an image of said keys while the operator observes said comparison negatives.

10. In a projection printer, in combination, image receiving means for receiving an image of the negative which is to be printed; a row of comparison negatives of different grades of contrast located adjacent and arranged along said image receiving means to be visible simultaneously with the latter; a series of containers respectively aligned with the comparison negatives and adapted to contain printing paper of grades of contrast corresponding respectively to the contrast grades of the comparison negatives, so that the operator after selecting a comparison negative uses the printing paper in the container aligned with the selected comparison negative; and illuminating means for illuminating said row of comparison negatives, said illuminating means, said row of comparison negatives and said series of containers forming a unitary assembly.

(References on following page)

References Cited in the file of this patent

UNITED STATES PATENTS

| | | |
|---|---|---|
| 1,926,597 | Naumann | Sept. 12, 1933 |
| 2,231,395 | Schlegel | Feb. 11, 1941 |
| 2,322,044 | McFarlane et al. | June 15, 1943 |
| 2,380,244 | Jones et al. | July 10, 1945 |
| 2,460,060 | Butler | Jan. 25, 1949 |
| 2,794,366 | Canaday | June 4, 1957 |
| 2,795,168 | Bauer | June 11, 1957 |
| 2,853,921 | Biedermann et al. | Sept. 30, 1958 |